United States Patent [19]

Cool

[11] Patent Number: 4,473,849

[45] Date of Patent: Sep. 25, 1984

[54] SYSTEM AND APPARATUS FOR CONVERSION OF VIDEO SIGNALS TO FILM IMAGES

[75] Inventor: John K. Cool, Thousand Oaks, Calif.

[73] Assignee: Image Resource Corporation, Westlake Village, Calif.

[21] Appl. No.: 333,120

[22] Filed: Dec. 21, 1981

[51] Int. Cl.³ ............................................. H04N 9/491
[52] U.S. Cl. ..................................... 358/332; 358/345; 358/32
[58] Field of Search .................. 358/332, 345, 302, 32

[56] References Cited

U.S. PATENT DOCUMENTS 2,252,263 8/1941 Kremer .................................. 358/332
3,740,457 6/1973 Meeussen et al. .................... 358/332

Primary Examiner—Richard Murray
Attorney, Agent, or Firm—Fraser and Bogucki

[57] ABSTRACT

Gamma correction in an imaging system which provides photographic reproductions of images represented by video signals is achieved by controlling the duration of exposure of a constant intensity scanning beam. A moving threshold signal is swept at a varying rate corresponding to a gamma correction curve between opposite limits over a given total exposure interval, as the image is repeatedly presented. The instantaneous amplitude of the video signal is compared to threshold signal and the results of the comparison used to control whether the beam is on or off for a given picture area. The gamma correction curves are advantageously presented as numerical sequences defining interlinked incremental segments of different slope.

42 Claims, 13 Drawing Figures

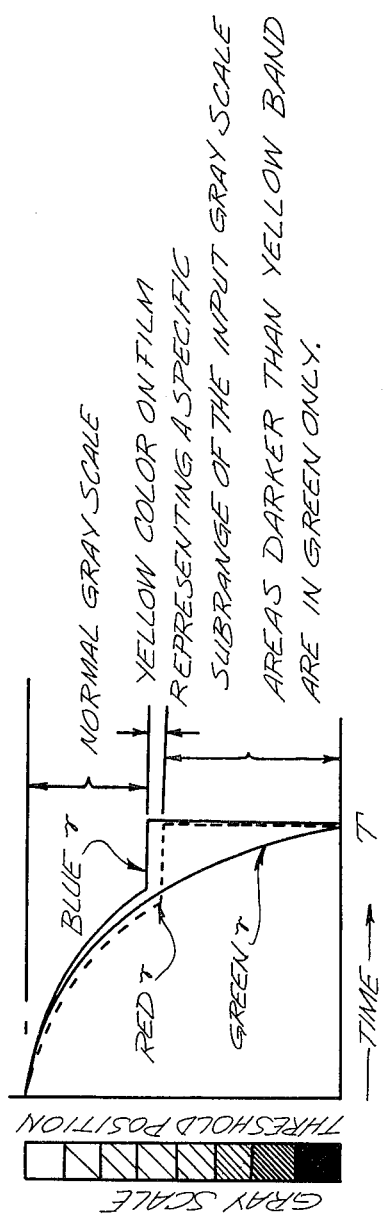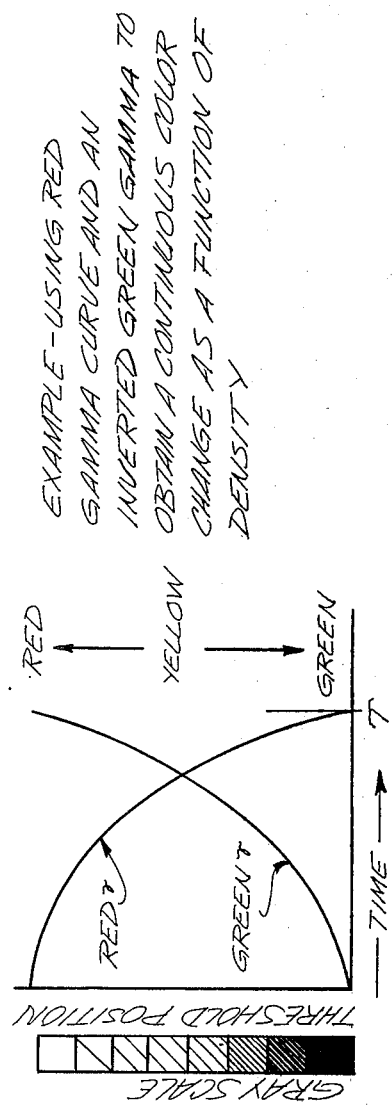

SYSTEM AND APPARATUS FOR CONVERSION OF VIDEO SIGNALS TO FILM IMAGES

BACKGROUND OF THE INVENTION

This invention relates to techniques for compensating nonlinearities and introducing predetermined variations in the conversion of electronic signals representing video images to images on photographic media.

A number of systems are known for generating color and pseudo-color displays from input video signals presented in raster scan format. Some of these systems process and thereafter convert the video signals derived from image scanning into photographic records of the images more precisely than can direct exposure techniques. A number of factors, some readily evident and others more subtle although still important, preclude obtaining true colors and contrasts when direct exposure is used. It need only be noted that photographic media are inherently nonlinear and that photographic dyes are not only of different colors than CRT phosphors but also function subtractively whereas the color image in a CRT is formed additively. These mismatches at the minimum cause loss of true color, saturation and detail. Conversion of the information contained in video signals to a photographic image not only requires compensation for these and other factors, but also desirably includes a number of other capabilities. It is desirable for example to be able to process images so as to generate negatives as well as positives, pseudo color as well as true color images, and to adjust contrast, hue and luminance to meet individual preferences.

Various workers in the art have resolved these problems with different degrees of success. An outstanding example of a system of general applicability for the conversion of video data to photographic hard copy is provided by the "VIDEOPRINT" system products of Image Resource Corporation of Westlake Village, Calif. As described generally in an article entitled "Microprocessor-Controlled System Prints Color TV Pictures" by Leon Levinson and Edmund Newbert in *Electronics* magazine for Sept. 22, 1981, pp. 121-125, these systems operate by sequentially generating three different images, one for each color on the photographic medium, on a precision CRT. For each color image a different color filter matched to the corresponding film color is interposed between the CRT and the film. The image is recorded under control of the microprocessor, which determines the exposure time and light intensity variations during each image scan. Because, as described in the article, this system enables many adjustments to be made and includes other features such as raster line elimination, it produces photographic images of high color quality and resolution.

As is typical in modern technology, however, demands are constantly made to achieve further advances in the art with these systems. One significantly desirable feature is the incorporation of a precise but versatile control of light intensity variations with signal amplitude. The need for this function, known generally and hereafter referred to as the gamma function, arises from nonlinearities in the signal transfer paths and the media involved. Because of gamma function nonlinearities, distortions may occur (speaking in monochrome terms) in the white, gray or black contrasts, or in the relationships between them. In color systems, gamma distortion may vary between different colors. The techniques heretofore used for compensating gamma distortion have used nonlinear amplifiers or other compensating circuits in the transfer path, to attempt to achieve an overall linear response. While such techniques can be utilized to optimize a system under one given set of conditions, i.e. a specific device operating with a particular film, this does not satisfy current needs. At most, only coarse "black stretch" or "white stretch" compensation can be introduced in balancing the image. Furthermore, the precision required in these systems means that the minor differences that exist between successive products coming off an assembly line can introduce excessive variations in signal transfer functions. These product-to-product variations can only be compensated by lengthy and expensive individual tuning procedures. Further, such tuning can correct for only one particular set of conditions and other corrections must remain as approximations.

Prior art approaches can therefore be seen to be unsuitable for compensating for the full scope of gamma function nonlinearities arising from cathode ray tube, signal transfer path and photographic media characteristics. They also have limited capability for generating negative/positive images or pseudo-color images and prior expedients also offer only limited versatility with regard to contrast adjustment, color enhancement and other types of color manipulation.

SUMMARY OF THE INVENTION

These and other desirable functions are provided, in systems and methods in accordance with the invention, by using duration modulated, constant intensity exposure control during regeneration of individual images as a photographic media is exposed. Duration modulation is achieved by comparing the instantaneous amplitude of a video signal to a reference that slowly varies as successive scans are provided, and turning a scanning beam of constant intensity on or off in accordance with the amplitude relationship.

The rate of change of the reference signal is controlled by storing digital data representing successive sets of reference values defining a number of different gamma function curves, and selecting one of these sets. The digital values of the chosen set control the rate of change of the reference signal throughout the total exposure interval, during which the video signal sequence for the given image is presented repeatedly. The changing reference signal is, however, substantially constant during each raster scan interval. Using the conversion to beam duration modulation together with digital storage, this system provides a highly versatile and adaptable gamma function control. A multiplicity of nonlinear curves of precisely determined form are made available, and these may be adjusted or supplemented by other curves under microprocessor control if desired. Furthermore, gamma function compensation may be customized readily for each of a number of copies of a given model by using a reference signal sequence to actuate the CRT, sensing actual signal variations, computing the compensating values, and then adjusting the digital data values in the sequence for a particular gamma function.

In a more specific example of a system in accordance with the invention, video signals are utilized with a raster scan CRT having a constant intensity writing beam. Electronic circuits establish a varying threshold reference that sweeps between maximum and minimum video signal amplitude levels at varying rates within a total exposure interval. The rates of change for successive amplitude bands are determined, under microprocessor control, by the stored data, which effectively define a plurality of linked linear segments of varying slope. To this end, in a particular example, each stored value establishes a pulse sequence having varying periodicity but a fixed total number, with the successive amplitude levels of the threshold being equally spaced. The non-linearly varying threshold is generated by continuously converting the accumulating digital counts to an analog signal amplitude. In consequence, for gamma correction those areas of the raster scan which are whitest receive the constant intensity beam for the greatest amount of time, those which are blackest receive the constant intensity beam for the least period of time, and the gray intermediate areas are proportioned according to the selected gamma function. Among the values and features of this system are the fact that families of curves can be derived and adjusted if necessary under microprocessor control, that a different family of curves can be utilized for each color, that the character of the curve may be varied widely, so as to provide white stretch, black stretch, contrast manipulation, positive/negative images, and color enhancement or manipulation.

BRIEF DESCRIPTION OF THE DRAWINGS

A better understanding of the invention may be had by reference to the following description, taken in conjunction with the accompanying drawings, in which:

FIG. 10 is a graph corresponding to FIG. 6 of one manner in which gamma variations may be used to create pseudo-color effects in systems in accordance with the invention; and FIG. 11 is a graph corresponding to FIG. 6 depicting one way in which gamma variations may be used to obtain a continuous color change as a function of density.

DETAILED DESCRIPTION OF THE INVENTION

Figure 1:
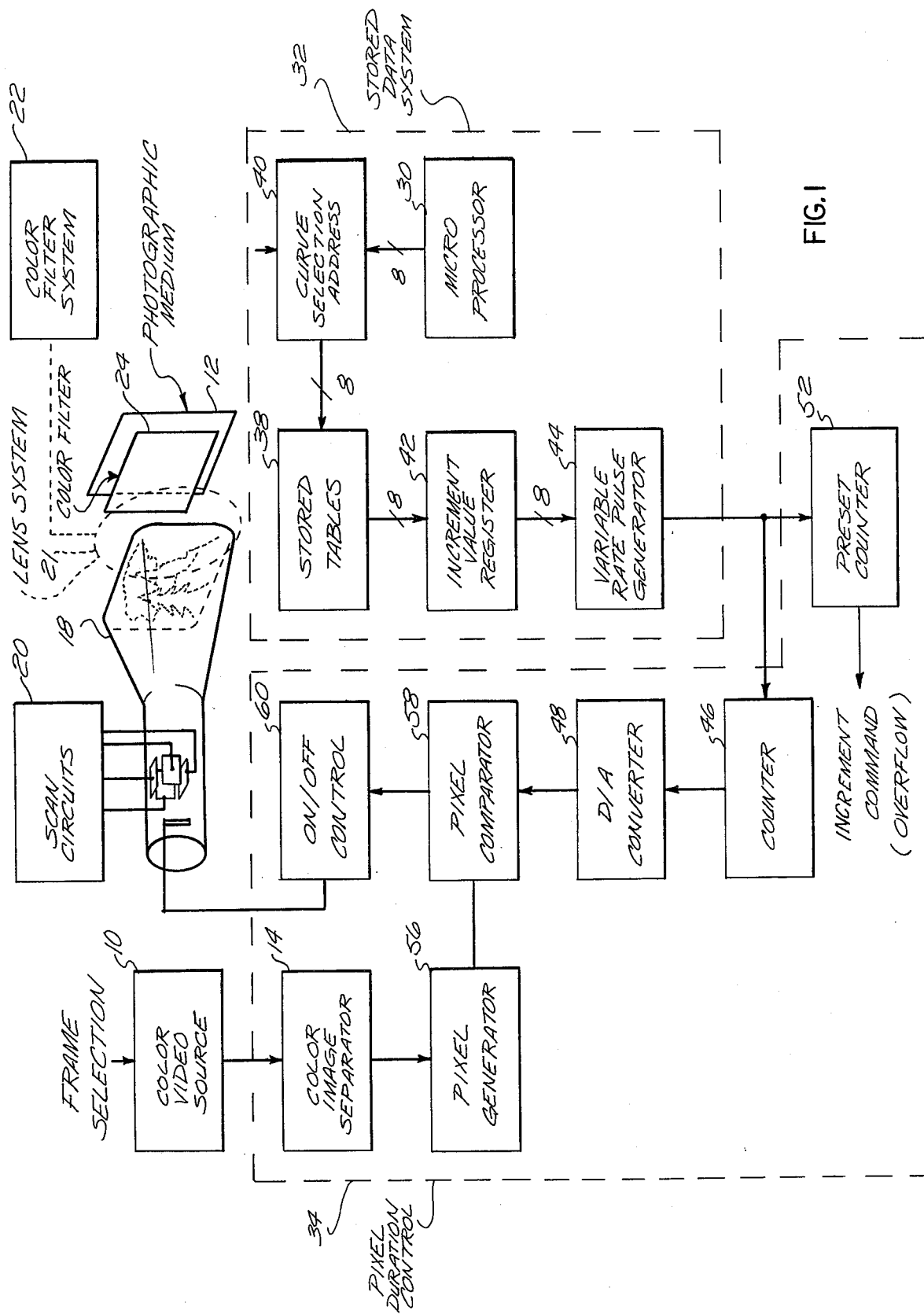
FIG. 1 is a simplified perspective view, partially broken away, of a system in accordance with the invention for providing images from video signals on photographic media.

A system in accordance with the invention, referring now to FIG. 1, may advantageously be utilized in conjunction with one of the "Videoprint" systems of Image Resource Corporation of Westlake Village, Calif. In the interests of brevity, only relevant portions of such a system have been depicted in FIG. 1 and will be described hereafter. A color video source 10 provides an encoded composite color television signal frame which is to be recorded as an image on a photographic color medium 12 (e.g. transparency, print negative or instant process film) by the system. For television compatible signals the color video source 10 may be a video cassette recorder, video tape recorder, video disk system or a storage tube or other device for presenting a single video frame over an interval sufficiently long for the signal to be processed. Alternatively, the source 10 could be a data processing display system generating a color image by one of the many techniques that are now in use.

In the "Videoprint" system a composite color television signal is processed to generate separate and successively presented green, blue and red images in what may be called a color image separator or decoder 14. The separator 14 extracts, for example, the red picture values for each picture element (pixel) in the display and presents these for as long as the red image is needed. The separation function is considerably simplified with a computer graphic display system because any desired display can be presented as a data sequence merely by software control. The term "pixel" is used herein for ease of reference in a general sense to denote both discrete points (as in a 512×512 matrix display) and successive segments of a continuum (as in a television raster line). It is immaterial in other words whether discrete digital (or analog) or continuous analog values are used or the displays are of the point or line type.

Scan circuits 20 operating in synchronism with the presentation of the monocolor image provide constant raster scan repetition on a high precision cathode ray tube 18 during the interval (of the order typically of a few seconds) that is selected for proper exposure of the photographic color medium 12. At typical frame rates the image for each color is thus presented many times during an exposure. It will be appreciated that details of the color image separator 14 and the data processor system which control selection of the exposure interval and switching from one color to another have been omitted for brevity. The optical system includes a lens system 21 (shown only generally) and a color filter system 22 that interposes successive and different color filters 24 in the optical path between the face of the CRT 18 and the photographic medium 12. The filters 24 are changed under control of the processor as different images are presented, but inasmuch as details are publicly available and not germane to the present invention they need not be further described. The "Videoprint" systems currently available use intensity modulation of the writing beam on the CRT 18, together with analog adjustment of the shape of the gamma function curve, in the manner previously described relative to the prior art.

In accordance with the present invention, however, the system utilizes a microprocessor 30, a stored data system 32, and a pixel duration control 34 which together provide time modulation of individual picture elements with a constant intensity beam. It will be appreciated by those skilled in the art from what follows hereafter that the stored data system 32 may alternatively be incorporated as part of the microprocessor 30 under software control.

In the stored data system 32, a memory subsystem provides a plurality of stored digital tables 38, each table corresponding to a succession of digital values representing a sequence of slope variations making up an individual gamma correction curve. Although the system will principally be described in terms of compensation for gamma, the stored tables 38 may alternatively or additionally be utilized for contrast control, special color effects or control of positive/negative image recording. For these purposes, access to the stored tables 38 is controlled by addressing the tables by a curve selection address decoder 40 which is responsive to operative conditions indicated by the microprocessor 30 or by the system operator, who may make manual mode selections or individual adjustments. In addition to manual control by the operator of such features as "black stretch", "white stretch", positive/negative selection and contrast control, the available modes include microprocessor control of compensation for the individual color being displayed, film type and other variables.

The address decoder 40 controls stepping from one position in the tables to another, from a start point under control of increment or count group pulses provided in operation of the system, as is described hereinafter.

A succession of individual values derived from the stored tables 38 are thus supplied to an output or increment value register 42, to indicate the slope of each successive increment of the gamma compensation curve that is being generated. A variable rate pulse generator 44 responds to the instantaneous digital value of the register 42 to provide a controlled rate clock output until the register 42 is reset with a new value. The variable clock output may be generated in conventional fashion, by converting the register 42 output to an analog signal that controls a variable frequency oscillator, or digital techniques may be utilized to employ the closest submultiple of the microprocessor 30 clock or a separately generated clock. In either event, the output of the variable rate pulse generator 44 is employed to establish a fixed count sequence (e.g. 32 pulses). The total duration of the fixed count sequence is determined by the clock rate for that increment. This arrangement also determines the rate of change of one increment of a curve, inasmuch as an output voltage change of varying slope is generated simply by inputting the variable rate pulses to a counter 46 which controls a digital-to-analog converter 48. The output of the digital-to-analog converter 48 is a moving or sweeping threshold signal which changes in slope at regularly spaced amplitude steps in accordance with the changes in values provided by the register 42. Furthermore, the total duration of each fixed count sequence is established directly by applying the pulses to a preset counter 52 which provides an overflow pulse denoting the occurrence of each group of 32 pulses. This overflow pulse or increment command is provided back to the address decoder 40 so as to shift to the next incremental segment of the selected gamma correction curve.

The moving threshold signal and the monochrome image signal for a given color from the color image separator 14 comprise the two inputs to the pixel duration control 34. A pixel generator 56 responsive to the monochrome image signal (red, green or blue) and to a color subcarrier clock derived from the video circuits of the system provides a constantly varying analog signal level that corresponds to the individual picture elements in the given color image. It will be recognized that the pixel sequences can be continuous or separate in time depending upon the nature of the display and the CRT. In either event, however, a comparison is constantly made between the video component of the monochrome image and the moving threshold, and the writing beam of the CRT 18 is turned on only when the comparator 58 indicates that the video signal amplitude is in excess of the moving threshold at that time. It is to be noted that the total display interval, T, is much greater than the scan time (t) for an individual image on the CRT 18. The moving threshold signal sweeps from one limit to another within its range over the interval of many successive CRT rasters, and these limits correspond to the deviation range (from black to white or vice versa) of the video signal. Consequently, for a system in which the threshold starts high and the comparator 58 output causes the on/off control 60 to go on, the writing beam at the CRT 18 is progressively turned on at increasingly darker areas until all gray areas are illuminated just before the exposure interval ends. The result is the presentation of a display for the given color in which the duration of exposure of any individual pixel is controllably varied with the gray level for that pixel. All writing on the photographic medium 12 is effected by a constant intensity beam, however.

A number of significant factors and relationships arising from this arrangement should be appreciated. The use of stored digital values to characterize the individual curves enables the system to take full advantage of the inherent capabilities of microprocessor and storage systems. Utilizing auxiliary storage, such as floppy disk drives, a virtually infinite array of curves can be made available. Thus for a particular application selections can be made from a large library on a floppy disk, and then entered into a high speed random access memory. Alternatively, such values can be stored in ROMs, PROMs or EPROMs or made available in other ways.

Because the curves are characterized by digital data, a wide variety of control features can be utilized. The threshold can sweep from the white to the black direction as described, or alternatively can sweep in the opposite direction. Image reversal can be obtained by simply operating the on/off control 60 so that the beam is "on" instead of "off" when the threshold exceeds the video signal. Unity gain inversion of the video signal would provide the same effect.

Figure 2:
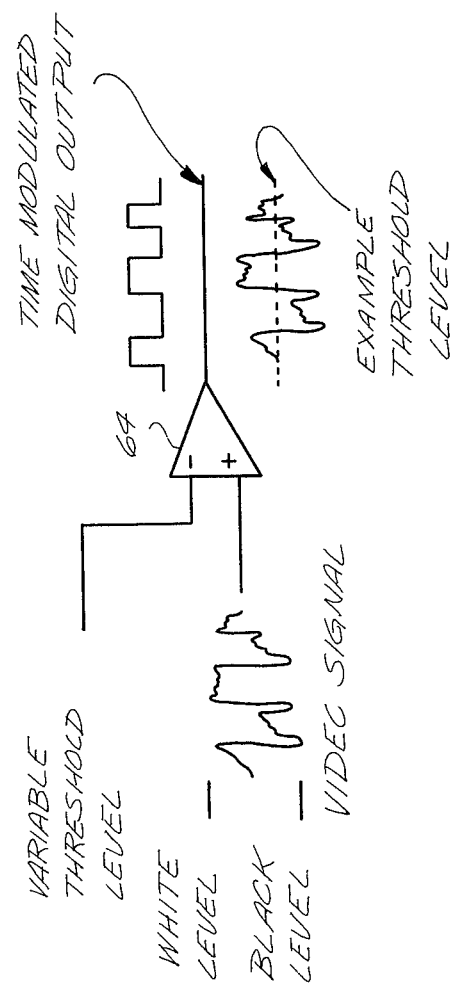
FIG. 2 is a block diagram of a circuit for providing gamma correction in accordance with the invention that may be utilized in conjunction with the system of FIG. 1, and showing different illustrative waveforms occurring at different points in the circuit.

The pixel comparator 58 and on/off control 60 of FIG. 1 may be provided as shown in FIG. 2 by a single operational amplifier 64 operated in a saturation mode whenever the video signal on one input exceeds the variable threshold level applied on the other input. The output of the amplifier 64 is a square wave signal, essentially a time modulated binary digital output, that goes high any time the video signal level exceeds the threshold voltage. With sufficient power, the signal can be used directly for beam intensity control. However, as shown, the signal is applied to the on/off control 60 that is responsive to a reference voltage that may be adjusted in the event that it is desired to change the level at which the constant intensity beam writes. A like control can be achieved using a control grid in the CRT or some other form of beam intensity control.

Figure 3:
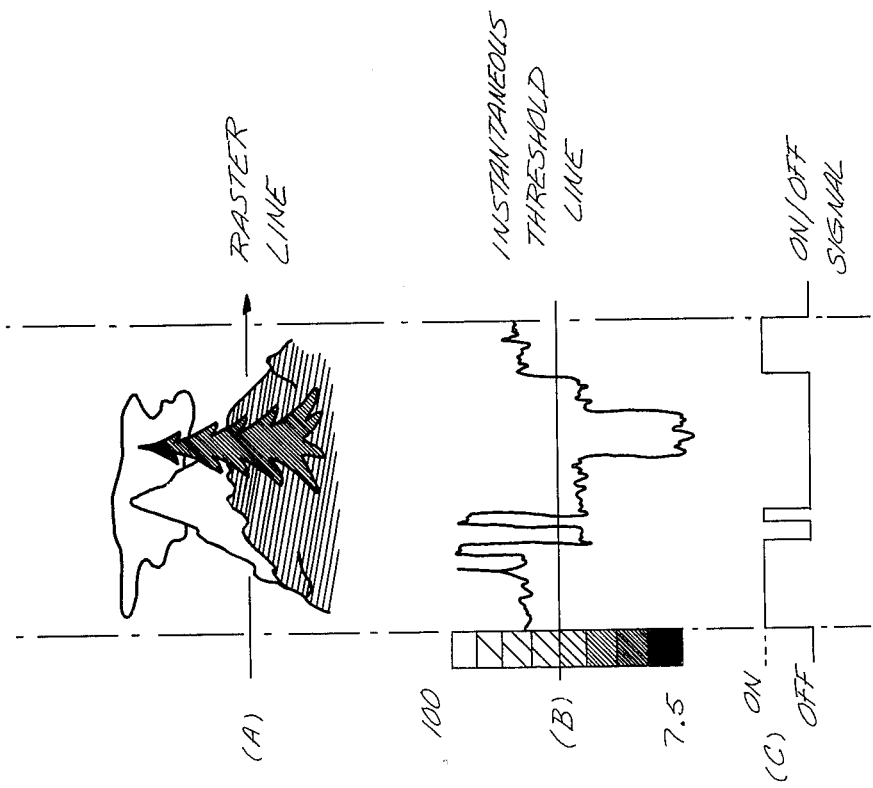
FIG. 3 is an idealized representation comprising a typical scene designated A and waveforms B and C corresponding thereto and useful in describing the operation of a gamma correction system in accordance with the invention.
Figure 4:
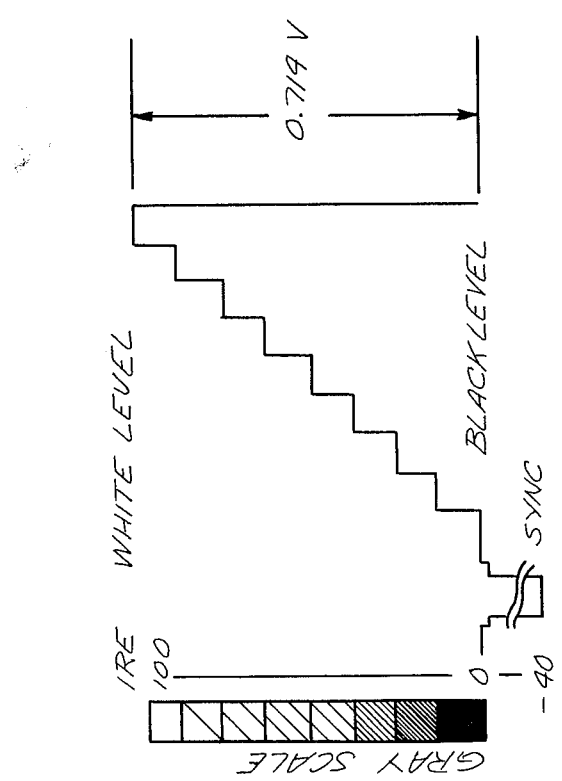
FIG. 4 is a simplified graphical representation of the relationship between video signal and gray scale.
Figure 7:
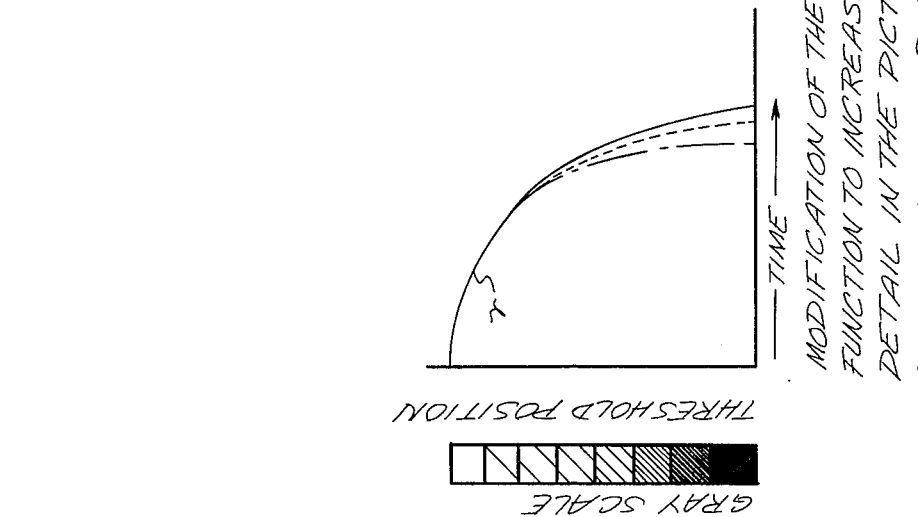
FIG. 7 is a graph corresponding to FIG. 6 of an illustrative family of gamma compensating curves that may be used for "black stretch"
Figure 6:
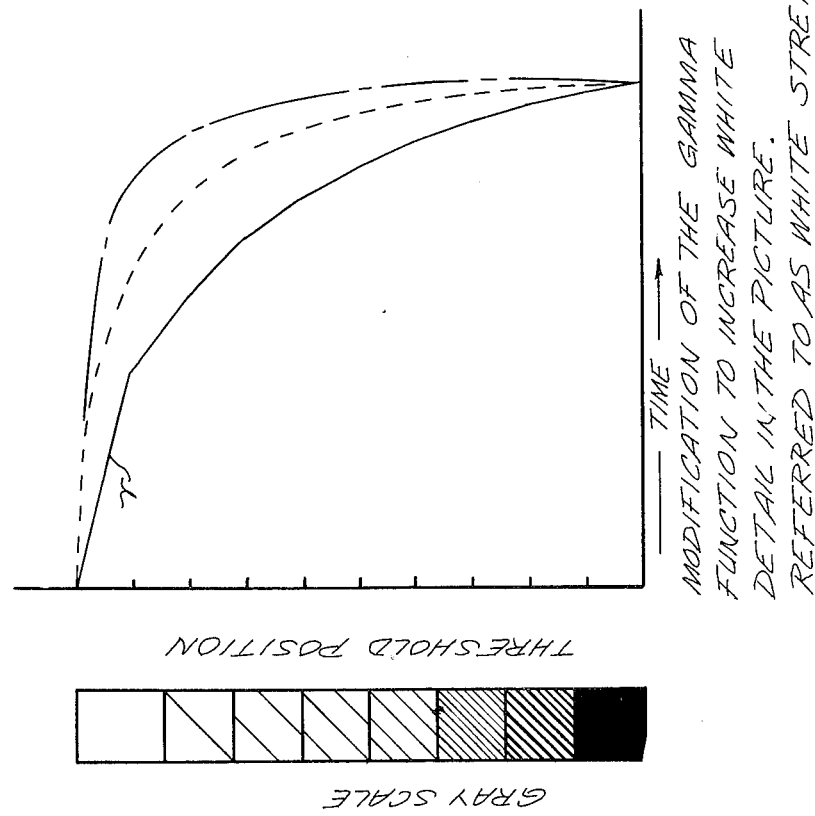
FIG. 6 is a graph with amplitude as the ordinate and time as the abscissa of an illustrative family of gamma compensating curves that may be used for "white stretch" in systems in accordance with the invention.

FIG. 3 depicts the relationship of the different signals when scanning an arbitrary chosen raster line for a given scene in the arrangement of FIG. 1. The video scene at A in FIG. 3 is intercepted by a scanning raster line that goes through areas of light, gray and dark at different times. For the chosen line location, this generates the video signal indicated at B in FIG. 3, with the intermediate starting level representing the sky, the highest intensity level representing the snow on the mountain, the mountain itself being essentially gray and the foreground pine tree being essentially black. These levels are depicted in FIG. 4 relative to a standard deviation of 0.714 volts in the video signal between black and white, and a variation on the IRE scale of +7.5 to 100. The standards specify that zero to 100 represents the range of the pedestal or blanking level to the white level but −40 is used as the synchronizing signal level. Consequently, as shown in curve C of FIG. 3, the time modulated writing beam is fully on whenever the video signal exceeds the threshold, no matter by how much. The moving threshold does not differ to any significant extent between the start and end of a single raster sweep. There is a slight difference between the start and end of a frame, which at the most provides a virtually indiscernible gradation in the vertical image direction. However, this can be compensated in a number of ways including stepping the threshold in the blanking region or introducing a slight ramp function into the intensity control.

Figure 5:
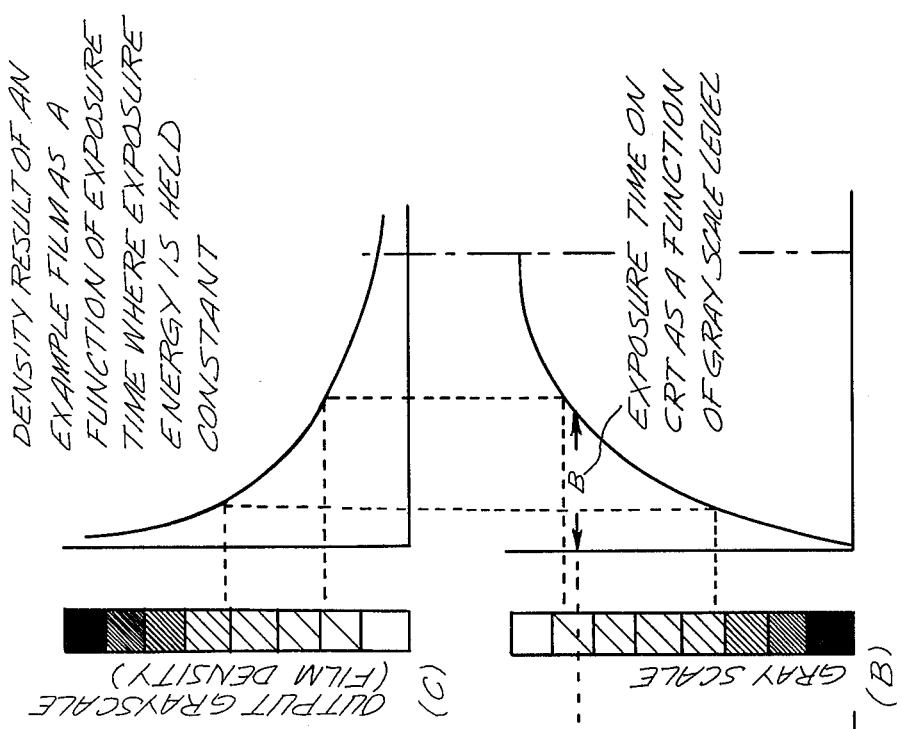
FIG. 5, comprising graphs A, B and C, illustrates the relationship between threshold signal level, exposure time and film density.

The curves A, B and C of FIG. 5 depict the relationship between the threshold level and the length of time each gray scale level is present on the CRT, and then the correspondence between this exposure time and the resultant density on the photographic film being exposed. As seen by the horizontal and vertical dotted lines that interconnect curves A, B and C, the significant parameters are all directly interrelated inasmuch as the distance $\beta$ on curve A is directly determinative of the exposure time $\beta$ on the CRT, which in turn is directly determinative of the film density because exposure energy is held constant.

Gamma corrections can be used in a wide variety of ways as depicted in FIGS. 6-11. A normalized gamma curve is shown by the solid line in FIG. 6, which is the only Figure showing the interconnected sequence of varying slope increments which make up the curve. "White stretch" variations may be introduced using deviations from the normalized curve as shown by the dotted and dot-dash lines in FIG. 6. Increasing the black detail, known as "black stretch" is achieved by the family of curves shown in FIG. 7. The curves are shown as two separate families for clarity only inasmuch as the normalized solid line curves are the same.

Figures 8, 9:
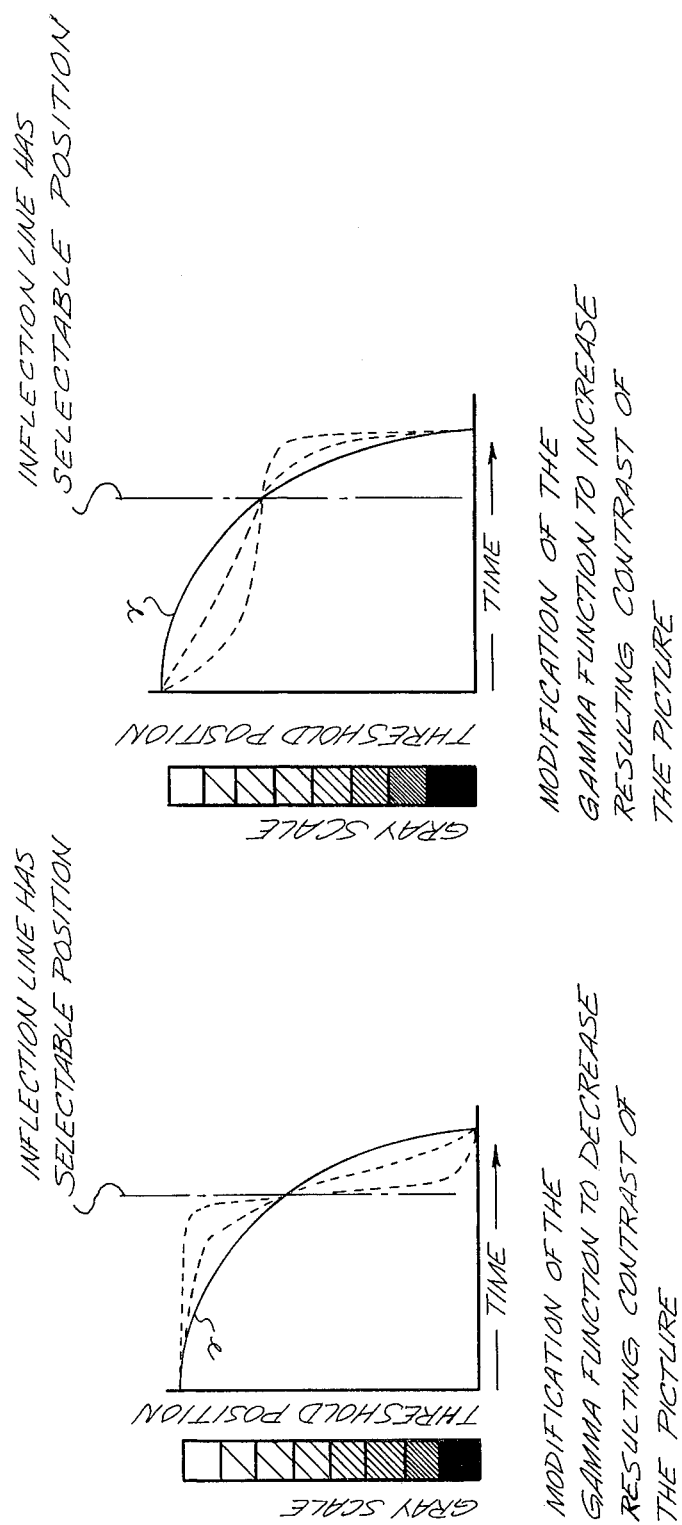
FIG. 8 is a graph corresponding to FIG. 6 of an illustrative family of gamma compensating curves that may be used for providing decreased contrast.
FIG. 9 is a graph corresponding to FIG. 6 of an illustrative family of gamma compensating curves that may be used for providing increased contrast.

The gamma compensation curves may also be used to vary contrast, as depicted in FIGS. 8 and 9, which demonstrate decrease and increase of contrast respectively. It can be seen that the steepest slopes on the decreased contrast curves (FIG. 8) are at some inflection position in the gray scale region so that exposure time throughout the gray scale is largely the same and contrast is thus diminished. The curves for increased contrast (FIG. 9) deviate oppositely from the normalized curve with minimum rate of change being used in the gray scale region about the inflection position. As noted, the location of the inflection line can be placed at any selected region along the time axis.

As has been noted, the arbitrary variations that are feasible in the compensation curves enable a wide range of color effects to be achieved in systems in accordance with the invention. In a three-color system, as depicted in FIG. 10, pseudo-color effects in one or more colors can be obtained by artificial variation of the curves for one or more colors. With the curves of FIG. 10, three different color effects are obtained in a color film record. For video signals above a given threshold, whether red, green or blue, the normal gray scales are maintained, giving bright, composite color areas. For an intermediate range, between the horizontal shoulders in the blue and red curves only the green and red are operative, because any blue components that are of lower signal level are turned off. Consequently, the red and green combine in this specific subrange to provide a yellow image. Below the red horizontal shoulder, however, only the green component is present, so any areas on the image that are darker than the yellow band are only in green. This relationship enables ready visual distinction of different intensity levels, and gives a pseudo-color display with greatly enhanced contrast for particular purposes. A different type of pseudo-color display is provided by the compensating curves of FIG. 11, in which the red and green curves are sloped in opposite senses. Here white areas appear as red, the dark areas appear as green, and the intermediate area represents different shades of yellow merging into the red and green respectively.

A further benefit of systems in accordance with the invention derives from the fact that the characteristics of each production unit can readily be identified and compensated to a predetermined standard. An external computer or the microprocessor in the system can be utilized in calculating the precise compensation curves needed for a standardized output. For a reference (i.e. display) image, a given excitation signal is applied to the CRT. One or more sensors disposed in the optical path from the CRT measure the actual light output (brightness) and the signal duration for a given video level input. Readings may be taken at all the different levels at which the sweeping threshold curve changes slope, e.g. at video input level IRE units of 10, 20 . . . 100. From the sensed output (converted to a digital value) the computer can ascertain the deviation from standard in the signal transfer path and CRT. A correct gamma compensation curve can be computed as a set of digital values, using the ascertained deviations. Families of curves providing the variants noted above can also be computed and entered. Thus each production unit can provide normalized light outputs regardless of variations from nominal values within the different production units coming off an assembly line.

Although there have been described above and illustrated in the drawings various systems and methods in accordance with the invention, it will be appreciated that the invention is not limited thereto but encompasses all forms and variations within the scope of the appended claims.

What is claimed is:

1. A system for responding to a video signal varying between limits to provide a visible image having total illumination at individual image points that is compensatable for non-linearities, comprising:

means providing a multiplicity of raster scans with a scanning beam of an image area over a total exposure interval;

threshold means providing a variable level signal that varies progressively between the video signal limits over the total exposure interval; and means responsive to the relation between the instantaneous values of the video signal and the variable level signal for controlling the scanning beam intensity in binary fashion dependent upon the relation.

2. A system as set forth in claim 1 above, wherein the system further includes means coupled to the threshold means for controlling the rate of change of the variable level signal.

3. A system as set forth in claim 2 above, wherein the means for controlling the rate of change comprises a digital system including means for storing a sequence of digital values representing successive increments of different change rates within the total exposure interval, and means responsive to the digital values for changing the variable signal level accordingly.

4. A system as set forth in claim 3 above, wherein the digital system further comprises means responsive to the digital values for providing fixed count pulse sequences at variable rates in response thereto, and means for converting the fixed count pulse sequences to ramp signals of varying slope.

5. A system as set forth in claim 4 above, wherein the means for storing a sequence of digital values includes means for storing a number of sequences of digital values and wherein the system further comprises means for selecting one of the sequences of digital values.

6. A system as set forth in claim 2 above, wherein the means for controlling comprises means for compensating gamma variations in the system.

7. A system as set forth in claim 6 above, wherein the means for controlling comprises means for varying contrast in the illumination.

8. A system as set forth in claim 2 above, wherein the system includes means for varying the binary significance of scanning beam intensity changes in response to the relation between the video signal and the variable level signal, such that positive or negative images may selectively be generated.

9. The method of generating a selectively compensated radiant energy image of an image represented by video signal variations organized in raster scan fashion, comprising the steps of:

generating a raster scan pattern having a constant intensity spot that may be turned on or off;

generating a reference signal that varies unidirectionally between the limits of the video signal over a total exposure interval; and comparing the video signal amplitude to the reference signal amplitude and controlling whether the spot is on or off in accordance with the instantaneous relationship thereof.

10. The method as set forth in claim 9 above, wherein the reference signal comprises a continuous set of increments of selectively variable slope.

11. The method as set forth in claim 10 above, wherein the increments change equally in amplitude but vary in length in the time domain.

12. The method as set forth in claim 11 above, wherein the raster scan pattern is generated a multiplicity of times within the total exposure interval and the variable reference signal is substantially constant within each individual raster scan pattern.

13. The method as set forth in claim 12 above, further comprising the steps of illuminating a photographic record with the radiant energy image, and varying the reference signal level non-linearly to compensate for system non-linearities.

14. The method as set forth in claim 13 above, including the further steps of storing a number of different non-linear functions, selecting one of the functions and controlling the reference signal variations in accordance therewith.

15. The method as set forth in claim 13 above, further including the steps of generating a pulse duration modulated signal corresponding to the amplitude relationship between the video signal and the reference signal, and turning the beam off when the reference signal is greater in amplitude than the video signal.

16. The method as set forth in claim 13 above, wherein the video signal varies between set amplitude limits and the reference signal varies between the same limits from minimum to maximum amplitude.

17. The method of compensating for non-linear transfer functions in converting video signals to an image on a photographic medium comprising the steps of:

generating a controlled intensity light spot;

shifting the light spot successively relative to the medium to generate a two-dimensional pattern of recording pixels;

generating a reference signal which changes nonlinearly with respect to time between a series of successive amplitude levels; and controlling the duration of exposure of the light spot at each recording picture element in accordance with the relationship of the amplitude of the video signal for that picture element to the corresponding amplitude of the reference signal.

18. The method as set forth in claim 17 above, wherein the changes of the reference signal with respect to time between the successive levels are controllable, such that whiteness or blackness of the image may be stretched.

19. The method as set forth in claim 18 above, wherein the time interval from one level to the next is determined by the periodic rate at which a predetermined number of counts is delivered, whereby each interval between levels has a predetermined slope.

20. The method as set forth in claim 19 above, wherein the time intervals are defined by stored digital data representing a family of curves including optimum compensation, black stretch and white stretch.

21. The method as set forth in claim 20 above, wherein the stored digital data are derived by generating a gray scale video reference signal, controlling the light spot intensity with the reference signal, sensing the light spot amplitude at each of the video reference signal amplitudes, and generating curve data as a sequence of slope values.

22. The method as set forth in claim 18 above, wherein the video signals represent a color image and the photographic medium is a color medium, further comprising the steps of:

displaying separate color images for selected intervals to the photographic medium while using a selected reference signal variation for each color.

23. The method as set forth in claim 22 above, wherein the reference signal varies between limits corresponding to the amplitude range of the video signals over the exposure intervals for each color.

24. The method of providing a compensated photographic record of a color image represented by video signals comprising the steps of:

generating successive monochrome displays of the separate color components of the image using a constant intensity beam;

modulating the duration of exposure of different picture elements in the display in accordance with the relation of the video signal amplitude to a variable reference level;

sweeping the variable reference signal through the dynamic range of the video signal in accordance with a predetermined function over the total exposure time of the individual display; and projecting color filtered images of each display onto the photographic record.

25. The method as set forth in claim 24 above, further including the steps of providing each monochrome display as a succession of raster scans with individual intervals t which are much smaller than the total exposure time T for the display.

26. The method as set forth in claim 25 above, further including the step of selecting one of a set of predetermined non-linear functions for controlling the sweep rate variations of the reference signal.

27. The method as set forth in claim 26 above, wherein the non-linear functions are defined by sets of digital values representing a succession of linked increments of varying slope.

28. The method as set forth in claim 27 above, further including the steps of varying the reference signal from a maximum to a minimum over the exposure interval and turning on the constant intensity writing beam whenever the video signal instantaneous value exceeds the instantaneous value of the reference signal.

29. The method as set forth in claim 28 above, further including the steps of comparing the reference signal to the video signal and generating a binary time modulated wave in response to the comparison.

30. A system for generating a photographic record of the image represented by color video signals, comprising:

means including constant intensity writing beam means for generating a raster scan display at a high repetition rate, the photographic medium being exposed to the raster scan display;

means responsive to the color video signals for controlling the writing beam means to display the image corresponding to the different color components for selected exposure intervals, said means including means for time duration modulation of the on/off state of the writing beam means for picture elements in the display in response to the amplitude of the corresponding portion of the video signals; and means between the display means and the photographic medium for converting each displayed image to an image of different color.

31. The invention as set forth in claim 30 above, wherein the means for time duration modulation comprises means providing a time varying reference signal and means for comparing the instantaneous value of the video signal to the value of the reference signal.

32. The invention as set forth in claim 31 above, wherein the time varying reference signal varies between limits over the total exposure interval for a display and wherein the exposure interval is substantially longer than the interval for an individual raster scan, such that a number of raster scans are provided during an exposure interval.

33. The invention as set forth in claim 32 above, wherein the means providing a time varying reference signal includes means providing a plurality of reference functions that are non-linear in nature.

34. The invention as set forth in claim 33 above, wherein the reference functions represent gamma compensation functions and wherein a different compensation function is provided for each color display.

35. The invention as set forth in claim 34 above, wherein the system further includes means for storing the reference functions as a plurality of sets of digital values and means for selecting one set of the values for use in conjunction with a given color display.

36. The invention as set forth in claim 35 above, wherein the digital value sets comprise a sequence of slope values and the system further comprises means responsive to the slope values for generating a varying threshold signal.

37. The invention as set forth in claim 36 above, wherein the system further comprises means responsive to the instantaneous values of the video signal and the threshold signal and coupled to turn on the writing beam at constant intensity whenever the video signal is of greater amplitude.

38. The invention as set forth in claim 37 above, wherein the threshold signal varies from high to low during the exposure interval.

39. The invention as set forth in claim 37 above, wherein the means for generating a varying threshold signal comprises means responsive to the digital values for generating pulse sequences at different rates responsive to the values, counter means responsive to the pulse sequences and digital to analog means responsive to the counter means.

40. The invention as set forth in claim 39 above, wherein the system further includes means responsive to the pulse sequences for selecting a different digital value in the sequence in response to a predetermined number of pulses such that the function is defined as a curve of linked increments of varying slopes.

41. A system for generating a raster display during an exposure interval with control over the total illumination of individual pixture areas relative to the amplitude of a video signal corresponding to the individual picture area, comprising:

means responsive to the video signal for generating a raster scan image and including constant intensity scanning beam means;

means coupled to the means for generating an image for controlling the total exposure interval of the image; and means responsive to the instantaneous amplitude of the video signal and coupled to control the scanning beam means for controlling the duration of exposure of individual picture areas with the constant intensity scanning beam in accordance with a selected non-linear relation to the video signal amplitude for that picture area.

42. A system for gamma compensation in generating a display image with a scanning beam system in response to a video signal comprising:

scanning beam means including constant intensity beam means for providing a multiplicity of display images over an exposure interval;

reference level means providing a non-linearly varying reference that varies between limits over the exposure interval and defines a gamma compensation curve; and means responsive to the instantaneous relation of the video signal to the reference for controlling the beam means to hold the beam off when a given relation exists, such that the duration of exposure of elemental image areas is determined by the video signal and the gamma compensation curve.

* * * * *